US012442518B2

(12) United States Patent
Martini

(10) Patent No.: US 12,442,518 B2
(45) **Date of Patent: *Oct. 14, 2025**

(54) SYSTEM, DEVICE, AND METHOD FOR SUSPENDING DECORATIVE STRING LIGHTS

(71) Applicant: Richard Martini, Glenview, IL (US)

(72) Inventor: Richard Martini, Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,369

(22) Filed: Aug. 27, 2024

(65) Prior Publication Data

US 2025/0137622 A1 May 1, 2025

Related U.S. Application Data

(63) Continuation of application No. 18/499,774, filed on Nov. 1, 2023, now Pat. No. 12,072,081.

(51) Int. Cl.
*F21V 21/008* (2006.01)
*F21S 4/10* (2016.01)

(52) U.S. Cl.
CPC .............. *F21V 21/008* (2013.01); *F21S 4/10* (2016.01)

(58) Field of Classification Search
CPC ... H01R 25/003; F21V 19/0025; F21V 17/08; F21V 21/008; F21W 2131/10; F21S 4/10; F21S 4/20
See application file for complete search history.

(56) References Cited

U.S. PATENT DOCUMENTS

| | | | | |
|---|---|---|---|---|
| 3,325,765 A * | 6/1967 | Hart | H01R 25/003 | 439/736 |
| 6,056,422 A * | 5/2000 | Huang | F21S 4/10 | 362/396 |
| 11,519,551 B1 * | 12/2022 | Derman | F16M 11/08 | |
| 2022/0333747 A1 * | 10/2022 | Lin | F21S 4/10 | |
| 2023/0140469 A1 * | 5/2023 | Zou | F21V 17/002 | 362/217.01 |
| 2023/0151934 A1 * | 5/2023 | Lei | F21K 9/238 | 362/217.14 |

FOREIGN PATENT DOCUMENTS

| | | | |
|---|---|---|---|
| KR | 101631546 A * | 6/2016 | A47G 33/00 |
| KR | 2019130820 A * | 11/2019 | F21V 19/0065 |

OTHER PUBLICATIONS

Machine translation of KR-2019130820-A, retrieved from worldwide.espacenet.com on Oct. 21, 2024 (Year: 2024).*
Machine translation of KR-101631546-A, retrieved from worldwide.espacenet.com on Oct. 21, 2024 (Year: 2024).*

* cited by examiner

*Primary Examiner* — Abdulmajeed Aziz
*Assistant Examiner* — Steven Y Horikoshi
(74) *Attorney, Agent, or Firm* — Dunlap Bennett & Ludwig, PLLC

(57) ABSTRACT

A system, device, and method for suspending a decorative light strand, wherein the device embodies a drop suspender having a top support portion providing orthogonal through holes running parallel and perpendicular relative to the wiring of the light strand. Notched along a ceiling of each of the through holes are intersecting tracks, respectively. The ceiling tracks are cutout from the top support portion and thus have a continuous upper bound, except where the perpendicular ceiling track is bisected by the parallel ceiling track. The parallel track notch is shaped and dimensions to nest a guidewire running through the parallel support through hole.

11 Claims, 4 Drawing Sheets

SYSTEM, DEVICE, AND METHOD FOR SUSPENDING DECORATIVE STRING LIGHTS

CROSS-REFERENCE TO RELATED APPLICATION

This application claims the benefit of priority of U.S. non-provisional application Ser. No. 18/499,774, filed 1 Nov. 2023, as a Continuation thereof, the contents of which are herein incorporated by reference.

BACKGROUND OF THE INVENTION

The present invention relates to decorative lights and, more particularly, a system, device, and method for suspending decorative string lights.

String lights, also known as light strands, patio lights, Christmas lights, as well as many other names, can be used to enhance the aesthetics of indoor and outdoor spaces. Currently, a very popular look in string lights is what is called suspended drop lights. The string lights or light strands used in the suspended drop lights configuration have at least three distinct features: (i) the span between each light is significantly greater than the standard spaced-apart distance of typical Christmas or holiday lights; (ii) there is a “drop suspender” through which the electrical wiring passes, and from which the light bulb socket ‘suspends’ from, ala a pendant lighting; and (iii) utilization of relatively large light bulb sizes to enhance the aesthetic. Typically, the suspended drop lights configuration uses standard light bulb socket sizes (e.g., s ‘E26 socket’) and other relatively larger (as compared to standard Christmas lights) socketed lights bulbs—e.g., the E17 socket, which is used for C9 base bulbs as well as round G40 and G50 bulbs.

There are two ways to hang light string to effectuate the suspended drop lights configuration. In the first way, a user may simply drape the entire light string from point A to point B. However, because of the relative weightiness of the suspended light bulbs and relative lengthy span between light bulbs the lights “swag” or droop in the middle. Furthermore, it can be challenging to connect multiple sets end to end as the weight of each set of light strings tends to pull the connecting plugs apart. Moreover, when used for patio lights, which tend to be hung for a longer period than holiday lights, the suspended drop lights configuration are more susceptible to long term creep or droop.

The second way of hanging the suspended drop lights configuration year-round is through use of a guidewire to support these light string sets. The guidewire supports the weight and can also keep the lights looking nice by preventing not only the unsightly swag of the light strand but also by maintaining the plurality of light fixtures in alignment with each other.

With that said, it can be difficult to install the support guidewire to hang such light strands. A user, for instance, must first connect the guidewire at points A and B, and then line up each light fixture of the light string with the guidewire so that the light string and guidewire are secured together by separate fastener (for instance, through use of a zip tie) on a fixture-by-fixture basis.

Every fixture has a suspended drop device (or “drop suspender”) for supporting each fixture to the electrical wire of the entire light strand to enable the pendant-like suspension. In the prior art, each drop suspender has a top, support element with a hole oriented perpendicular to said electrical wire of the light strand, so that a user can connect the guidewire thereto by way of the separate fastener. This, unfortunately, leads to a rather insecure attachment to the guidewire, which in turn tends to result in the fixtures/bulbs not hanging plumb since tension from one or more of the separate fasteners can pull the hanging (from the drop suspender by way of a drop or pendant wire) fixture, out of perpendicular orientation relative to the light strand and askew relative to the guidewire. This explains why some users employ two fasteners (zip ties) per fixture, which exacerbates the already time-consuming installation process.

As can be seen, there is a need for a system, device, and method for suspending decorative string lights embodying a drop suspender that provides a tunnel ceiling track system for facilitating the installation along a guidewire when the light strand is spanning long distance, as well as facilitating direct connections between the drop suspender and supporting structure.

SUMMARY OF THE INVENTION

At the heart of the present invention, the system adds a grooved or notched track along a ceiling of a first through hole of a support portion of the drop suspender, wherein the ceiling track extends in a direction parallel with the light strand, so that a guidewire can nest in the ceiling track, thereby both ensuring that the light strand hangs straight without swag or droop between the fixtures/drop suspenders and correcting the deficiencies of the prior art in a manner that expedites installation of suspended drop light strands.

The top portion of the drop suspender may also have a second through hole through the support portion that is perpendicular to the first through hole, wherein this second through hole also provides a ceiling track. This second ceiling track facilitates connecting drop suspenders directly to support structure via a fastener that rides or slides through the second ceiling track.

In one aspect of the present invention, a device for hanging a suspended drop light string, the device includes the following: a support portion connected to an upper surface of a drop suspender; the support portion a first through hole extending in a direction parallel with the suspended drop light string; and a first track superjacent the through hole, wherein the track has a continuous uninterrupted first upper bound for engaging a guidewire for the suspended drop light string.

In another aspect of the present invention, the device further includes wherein a domain of the first upper bound is at least twenty percent less than a diameter of the through hole, wherein the first upper bounds are U-shaped; and further including a second through hole oriented substantially perpendicular to the direction of the first through hole, wherein a second track superjacent the second through hole has a continuous uninterrupted second upper bound except at an intersection with the first track.

In yet another aspect of the present invention, a method for hanging a suspended drop light string includes the following: providing the aforesaid device and stringing a guidewire through the first through hole, wherein the guidewire is dimensioned and shaped to nest into the first track under the force of gravity when the guidewire is attached at opposing ends.

In yet still another aspect of the present invention, a method for hanging a suspended drop light string includes the following: providing the aforesaid device and fastening an elongated fastener through the second track for engaging a supporting structure, wherein the elongated fastener engages a guidewire nested in the first track.

These and other features, aspects and advantages of the present invention will become better understood with reference to the following drawings, description and claims.

DETAILED DESCRIPTION OF THE INVENTION

Figure 1:
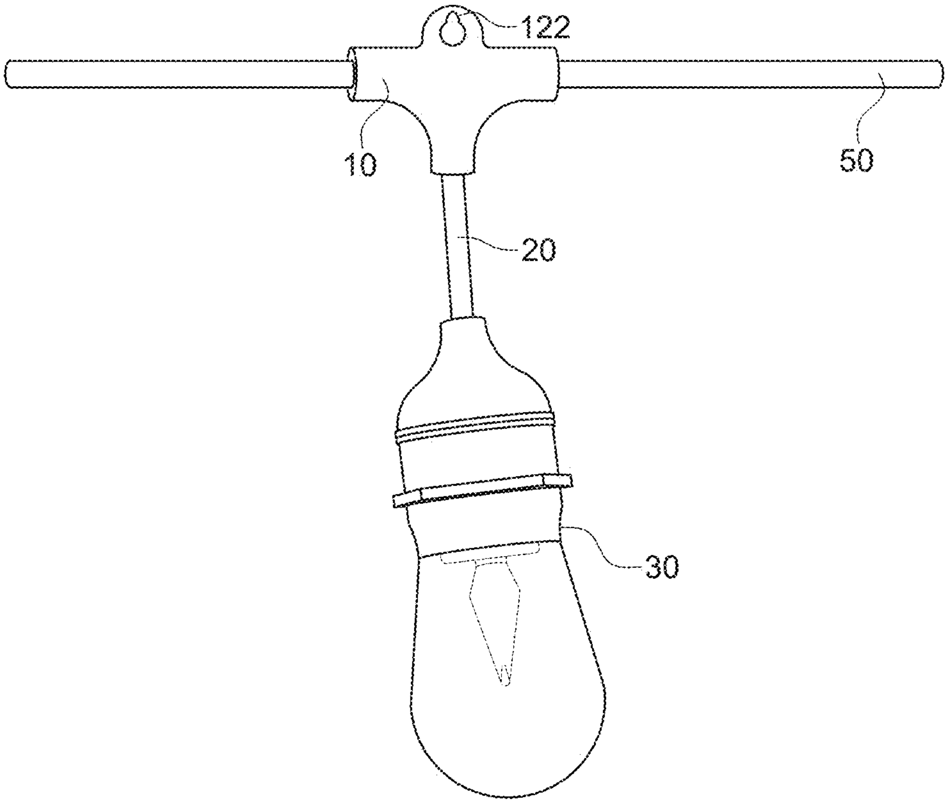
FIG. 1 is a perspective view of an exemplary embodiment of the present invention, without a guidewire.
Figure 2:
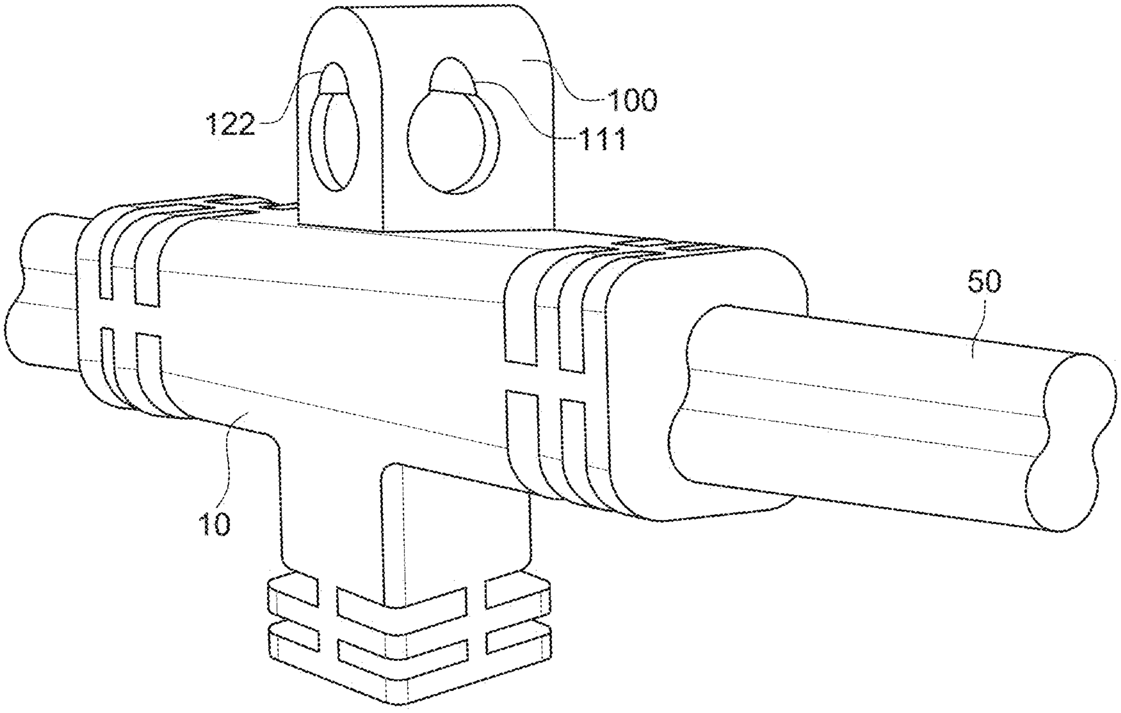
FIG. 2 is a detailed perspective view of an exemplary embodiment of the present invention, illustrating the perpendicular ceiling tracks 111 and 122.
Figure 3:
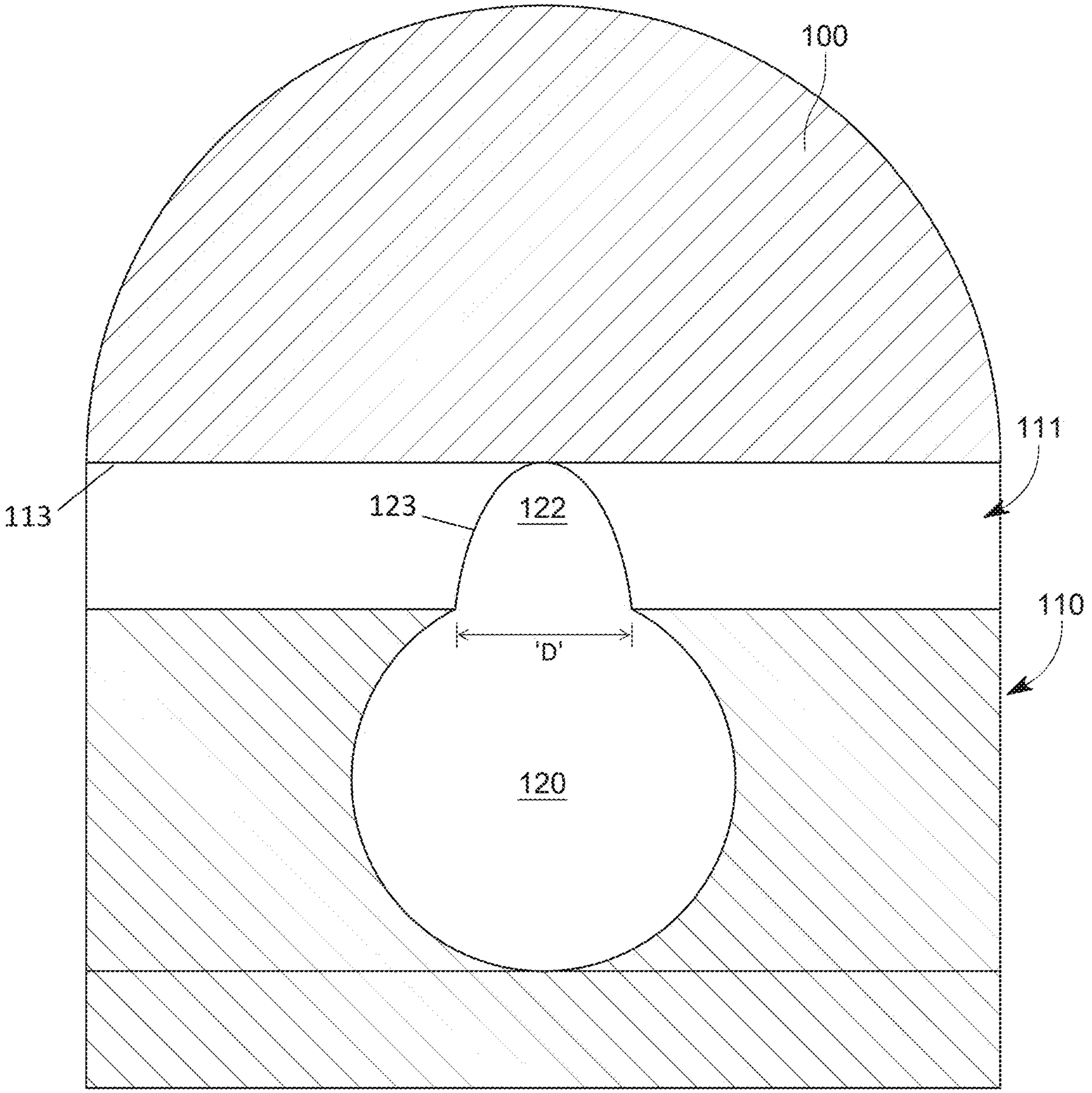
FIG. 3 is a longitudinal (parallel with the direction of the wiring 50 of the light strand) section view of an exemplary embodiment of the present invention, wherein 'D' defines a domain of the upper bound 123.
Figure 4:
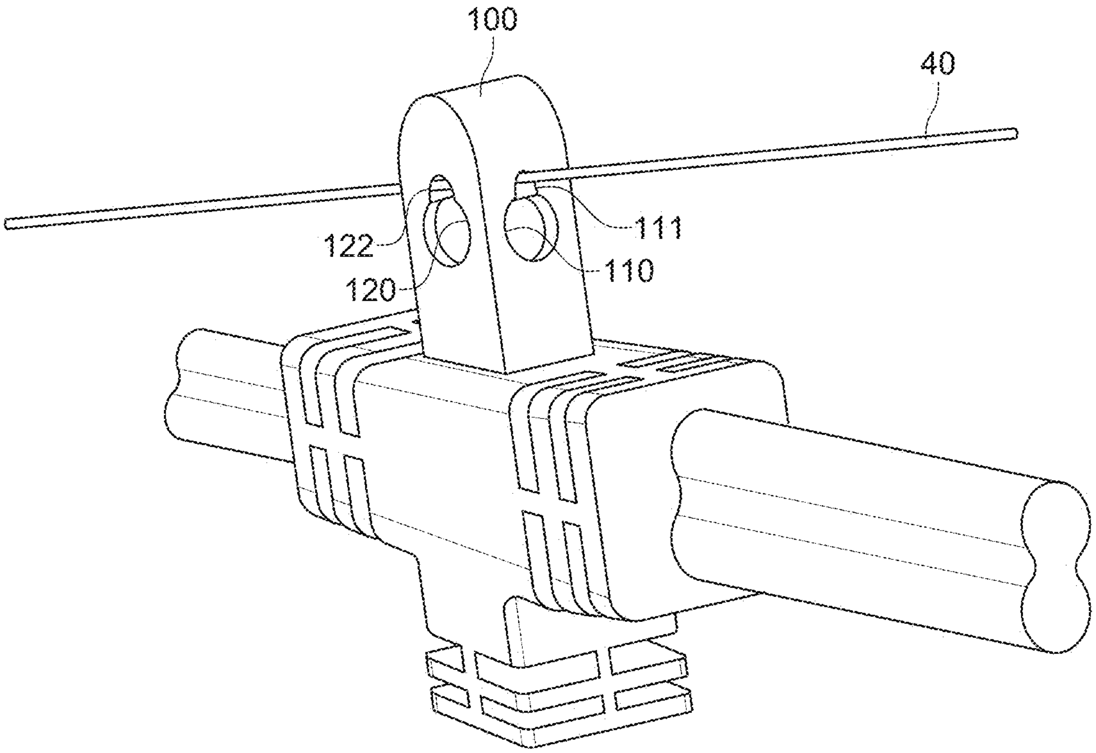
FIG. 4 is a detailed perspective view of an exemplary embodiment of the present invention, shown in use, enabling the guidewire 40 to nest in the ceiling track 111 of the parallel, first through hole 110.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a system, device, and method for suspending a decorative light strand, wherein the device embodies a drop suspender having a top support portion providing orthogonal through holes running parallel and perpendicular relative to the wiring of the light strand. Notched along a ceiling of each of the through holes are intersecting tracks, respectively. The ceiling tracks are cutout from the top support portion and thus have a continuous upper bound, except where the perpendicular ceiling track is bisected by the parallel ceiling track. The parallel track notch is shaped and dimensions to nest a guidewire running through the parallel support through hole.

Referring now to FIGS. 1 through 5, the present invention may include a drop suspender 10 for enabling suspended drop lighting along a light strand. The light strand provides a series of drop suspenders 10, wherein each drop suspender 10 provides a pendant wire 20 connected to a socket 30 that depends from the drop suspender 10 and thus the light strand.

The longitudinal axis of the elongated drop suspender 10 is parallel with the wiring 50 of the light strand and thus the guidewire 40 that supports the drop suspender 10, wherein the wiring 50 typically linearly extends from opposing longitudinal ends of the drop suspender 10, as shown in the Figures.

A support portion 100 is disposed along the upper surface of each drop suspender 10. The support portion 100 provides a first through hole 110 and a second through hole 120 that orthogonally intersect within the body of the support portion. The first through hole 110 extends in a direction parallel with the wiring 50 of the light strand, while the second through hole 120 is oriented orthogonal relative to the first through hole 110.

The first through hole 110 has a suprajacent (superjacent) first track notch 111 formed within the body of the support portion 100 (that would otherwise define the 'ceiling' of the first through hole 110). The first through hole 110 is dimensioned and shaped to receive a guidewire 40 passed through the first through hole 110. The guidewire 40 thereby nests in the first track notch 111, providing stability to the drop suspender 10 as the first track notch 111 is centrally oriented relative to the first through hole 110, which in turn is centrally oriented relative the support portion 100, which itself is centrally oriented relative to the drop suspender 10.

The second through hole 120 may provide a superjacent second track notch 122 formed within the body of the support portion 100 that would otherwise define the 'ceiling' of the second through hole 120. The second track notch 122 (or at least its upper bound 123) is bisected by the first track notch 122 (which extends in a perpendicular direction through the same body of the support portion 100). The first track notch 111, in contrast, has a continuous, uninterrupted upper bounds 113 as it extends superjacent the first through hole 110.

During use, the guidewire 40 may nest in the first notch track 111, urged there under the force of gravity, thereby enabling a 'tunnel ceiling track' system for the guidewire 40. This tunnel ceiling track system is effective in providing stability and tautness when the light strand is supported by the guidewire 40. This nested guidewire 40 enables the pendant wire 20 to depend plumb from the drop suspender 10.

Figure 5:
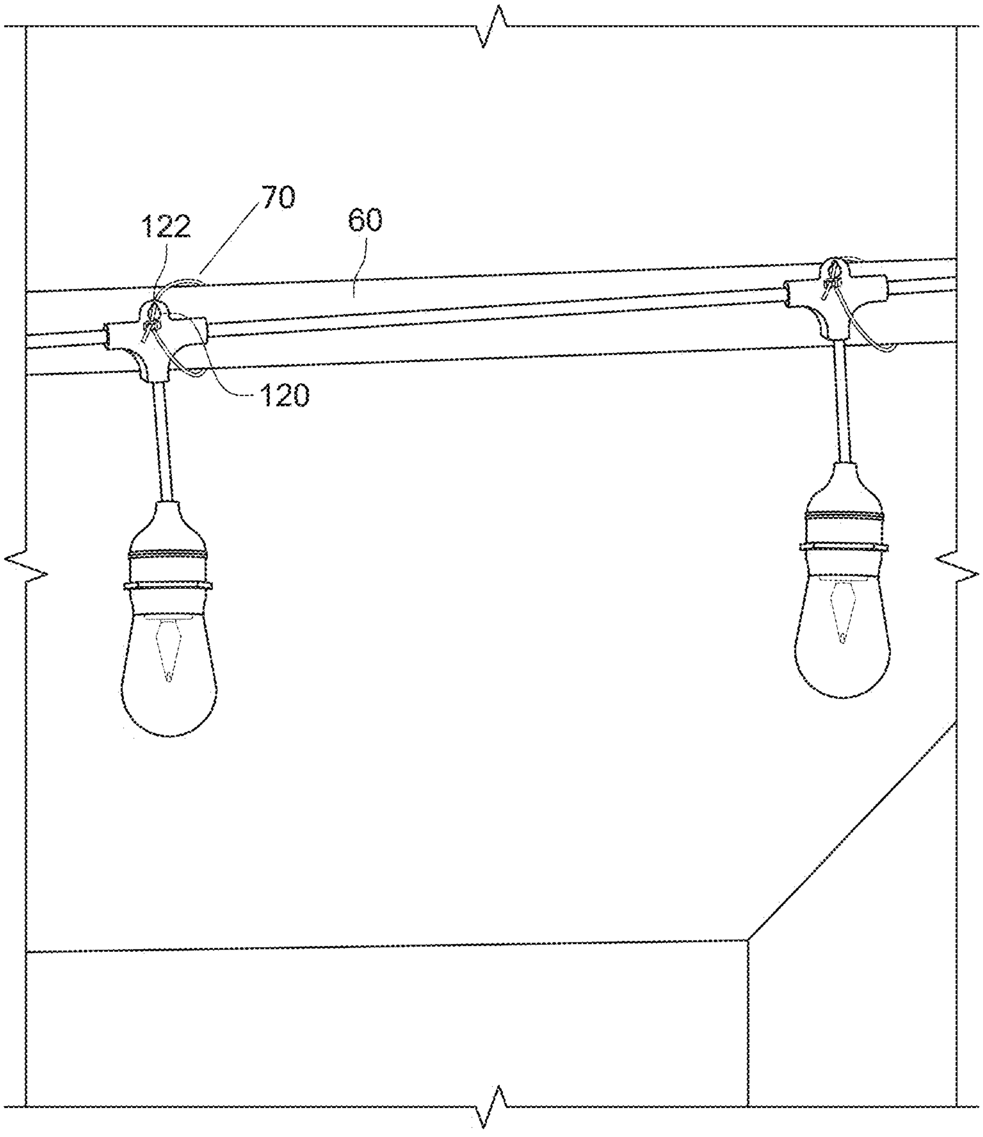
FIG. 5 is a perspective view of an exemplary embodiment of the present invention, enabling a fastener 70 to slide through the ceiling track 122 of the perpendicular, second through hole 120.

The second track notch(es) 122 may provide a void that aids in threading a fastener 70 orthogonal relative to the guidewire 40 to further support/connect the guidewire 40 to the support portion 100. Additionally, or alternatively, when a user of a suspended drop light strand wants to affix each drop suspender 10 directly to a structure 60, such as a building component (as opposed to stringing a light strand's only attached at endpoints) the second track notches 122 facilitate interconnecting the fastener 70 between the structure 60 and the drop suspender 10, as illustrated in FIG. 5.

One or both of the first and second track notches 111 and 122 may have a 'U' shape along the entire length as defined by an upper bound 113 and 123, respectively. This U-shape optimizes surface contact with the guidewire 40 as well as enables an easy feed of the fastener 70 (e.g., zip tie) there through so that the dependent pendant wire 20 and attached fixture hangs plumb.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A device for installing a suspended drop light string along and directly connecting to a guidewire without the use of one or more separate fasteners through a first through hole of device, wherein the suspended drop light string and the guidewire extend in a first direction, the device comprising:

a support portion rigidly connected to an upper surface of a drop suspender of a light of the suspended drop light string;

the support portion providing the first through hole extending in the first direction parallel with both the suspended drop light string and the guidewire, wherein the rigid connection of the support portion to the upper surface prevents the orientation of the first through hole from deviating from the first direction; and a track superjacent the first through hole, wherein the track has a continuous uninterrupted upper bound that longitudinally extends in the first direction, and wherein the first through hole extends a distance in the first direction that is greater than a diameter of the first through hole, whereby the guidewire, attached at opposing ends, enables the drop suspender to ride along the guidewire in the first direction by said track physically contacting the guidewire when installing the suspended drop light string.

2. The device of claim 1, wherein a domain of the upper bound is at least twenty percent less than a diameter of the first through hole.

3. The device of claim 1, wherein the upper bound is U-shaped.

4. A method for installing a suspended drop light string along a guidewire without the use of intermediate fasteners, the method comprising:

providing the suspended drop light string having a plurality of the devices of claim 1;

stringing a guidewire through the first through hole of each device, wherein the guidewire is dimensioned and shaped to nest into the track of said device under the force of gravity when the guidewire is attached at opposing ends; and urging said drop suspender of each device so that the suspended drop light string rides along said track.

5. The device of claim 1, further comprising a second through hole extending through the support portion, wherein the second through hole is oriented orthogonal relative to the first through hole.

6. A system for installing a suspended drop light string along and directly connecting to a guidewire without the use of separate fasteners, the system comprising:

a suspended drop light string having a plurality of light fixtures, each light fixture having a drop suspender, and wherein each drop suspender has opposing arms extending in a first direction so that an electrical wire, powering the suspended drop light string, extends in a first direction;

a plurality of devices of claim 1 each rigidly connected to a respective drop suspender;

a guidewire extending in the first direction; and the guidewire physically and directly contacting the track of each said device so that the plurality of light fixtures hang plumb.

7. A device for installing a suspended drop light string along and directly connecting to a guidewire without the use of one or more separate fasteners through a first through hole of device, wherein the suspended drop light string and the guidewire extend in a first direction, the device comprising:

a support portion rigidly connected to an upper surface of a drop suspender of a light of the suspended drop light string;

the support portion providing the first through hole extending in the first direction parallel with both the suspended drop light string and the guidewire, wherein the rigid connection of the support portion to the upper surface prevents the orientation of the first through hole from deviating from the first direction;

a track superjacent the first through hole, wherein the track has a continuous uninterrupted upper bound that longitudinally extends in the first direction; and a second through hole extending through the support portion, wherein the second through hole is oriented orthogonal relative to the first through hole, whereby the guidewire, attached at opposing ends, enables the drop suspender to ride along the guidewire in the first direction by said track physically contacting the guidewire when installing the suspended drop light string.

8. The device of claim 7, wherein a domain of the upper bound is at least twenty percent less than a diameter of the first through hole.

9. The device of claim 7, wherein the upper bound is U-shaped.

10. A method for installing a suspended drop light string along a guidewire without the use of intermediate fasteners, the method comprising:

providing the suspended drop light string having a plurality of the devices of claim 7;

stringing a guidewire through the first through hole of each device, wherein the guidewire is dimensioned and shaped to nest into the track of said device under the force of gravity when the guidewire is attached at opposing ends; and urging said drop suspender of each device so that the suspended drop light string rides along said track.

11. A system for installing a suspended drop light string along and directly connecting to a guidewire without the use of separate fasteners, the system comprising:

a suspended drop light string having a plurality of light fixtures, each light fixture having a drop suspender, and wherein each drop suspender has opposing arms extending in a first direction so that an electrical wire, powering the suspended drop light string, extends in a first direction;

a plurality of devices of claim 8 each rigidly connected to a respective drop suspender;

a guidewire extending in the first direction; and the guidewire physically and directly contacting the track of each said device so that the plurality of light fixtures hang plumb.

* * * * *